J. D. TEETERS.
GATE.
APPLICATION FILED SEPT. 22, 1915.

1,190,040.

Patented July 4, 1916.
2 SHEETS—SHEET 1.

WITNESSES
Chas H Leibman
J. E. Larsen

INVENTOR
Jefferson D. Teeters
BY Munn & Co.
ATTORNEYS

J. D. TEETERS.
GATE.
APPLICATION FILED SEPT. 22, 1915.
1,190,040.
Patented July 4, 1916.
2 SHEETS—SHEET 2.
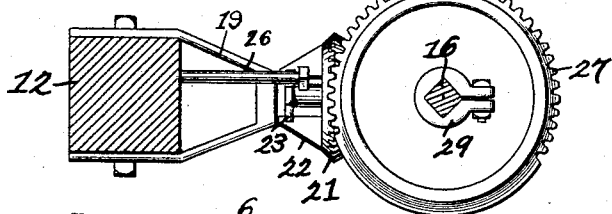
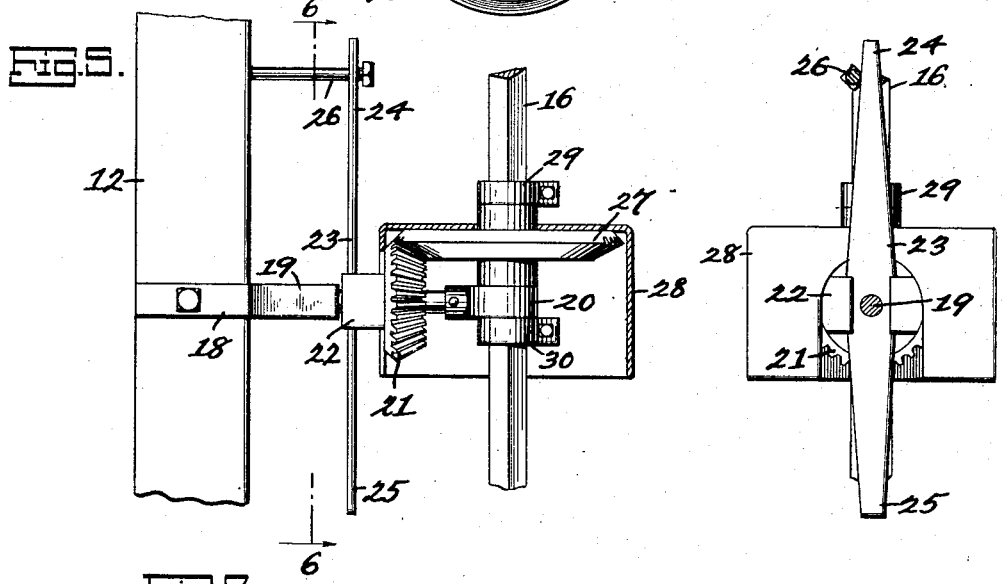
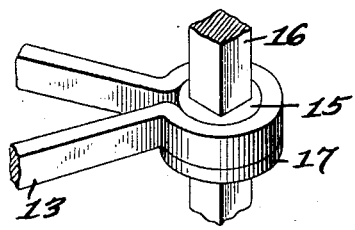
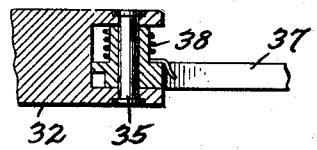
WITNESSES
Chas. H. Leibman
J. E. Larsen
INVENTOR
Jefferson D. Teeters
BY
ATTORNEYS

UNITED STATES PATENT OFFICE.

JEFFERSON D. TEETERS, OF NEWTON, NEBRASKA.

GATE.

1,190,040.  Specification of Letters Patent.  Patented July 4, 1916.

Application filed September 22, 1915. Serial No. 51,975.

*To all whom it may concern:*

Be it known that I, JEFFERSON D. TEETERS, a citizen of the United States, and a resident of Newton, in the county of Cherry and State of Nebraska, have invented certain new and useful Improvements in Gates, of which the following is a specification.

My invention relates to the fencing off of land, and the main object thereof is to provide an opening through said fencing and a gate therefor which opening is unlimited as to width in view of the fact that my gate is not supported by hinges in the manner of conventional gates.

My invention is fully described in the following specification, of which the accompanying drawings form a part, in which like characters refer to like parts in each of the views, and in which:—

Figure 1:
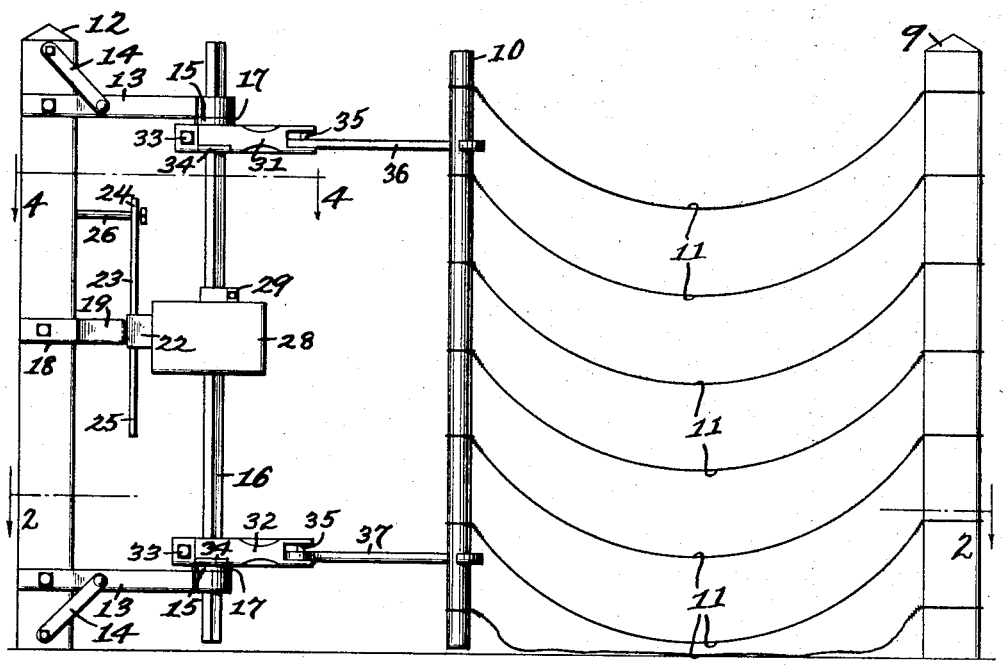
Figure 2:
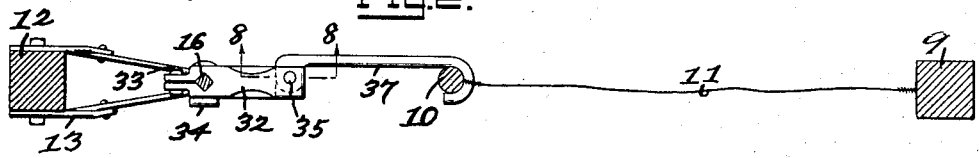
Figure 3:
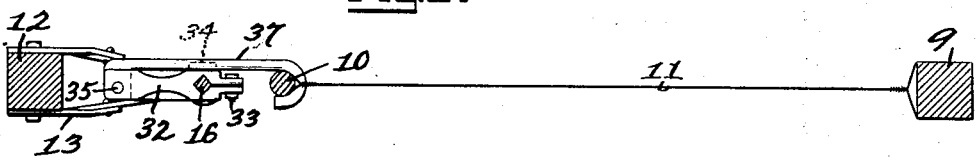

Figure 1 is a front view of a gate constructed in accordance with my invention, in unlatched condition; Fig. 2 is a section taken on the line 2—2 of Fig. 1; Fig. 3 is a similar view but showing the gate in latched condition; Fig. 4 is an enlarged, fragmentary, section taken on the line 4—4 of Fig. 1, with a casing shown in Fig. 1 omitted; Fig. 5 is a side view of Fig. 4 and an enlarged fragmentary view of Fig. 1, with the casing referred to shown in section; Fig. 6 is a section taken on the line 6—6 of Fig. 5; Fig. 7 is a view of a detail of the supporting bracket construction for the operating parts of my invention; and Fig. 8 is an enlarged fragmentary section taken on the line 8—8 of Fig. 2.

My gate consists primarily in a plurality of flexible elements, such as wires, secured to a fixed post 9 and to an independently movable rod 10 vertically arranged when in normal position, the wires 11 being of such length as to permit the rod 10 to be drawn nearly across the opening in the fence between the fixed post 9 and a complemental fixed post 12, but not entirely for a reason later made clear.

The post 12 carries two brackets 13 suitably braced as at 14 and the outer end of each of which is formed into a ring to receive a rotary collar 15 provided with an angular hole therethrough for the reception of an angular shaft 16, as clearly shown in Fig. 7, each of said collars 15 being provided with a flange 17 resting on the adjacent surfaces of the respective brackets.

Intermediate the height of the post 12 is another bracket 18 which carries a stub-shaft 19 steadied at its outer end by means of a sleeve 20 held in fixed relationship with and on the shaft 16 and within which the shaft 16 is freely rotatable. Freely rotatable on the stub-shaft 19 is a bevel pinion 21 which carries a hub 22 provided with a vertical slot therethrough for the reception of a lever 23 by means of which the pinion may be manually rotated, the hub being shown as two simple arms integral with the pinion in Figs. 4 and 6 but it may be of any desired form. The lever 23 is provided with a longer arm 24 and with a shorter arm 25, and the post 12 carries a stop 26 in the path of the longer arm 24 but outside the path of the shorter arm 25, thereby permitting rotation of the pinion 21 through approximately a complete circle.

The pinion 21 is enmeshed with a bevel gear 27 immovably fixed on the shaft 16 whereby revolution of the gear 27 by means of the pinion 21 correspondingly rotates the shaft 16, and I may provide a casing 28 of any desired form to inclose the pinion and gear, straps 29 and 30 maintaining these parts in desired relationship with the shaft 16. As will be seen by reference to Fig. 4, the gear 27 is of the mutilated type in order to limit the degree of movement of the shaft 16, the teeth of said gear extending for slightly more than 180 degrees of a circle, and the gear 27 bears a ratio of 2 to 1 with respect to the pinion 21 whereby a complete revolution of the latter will revolve the former through 180 degrees of a circle.

The shaft 16 carries an arm 31 adjacent the upper bracket 13 and an arm 32 adjacent the lower bracket 13, these arms being split and provided with an angular passage therethrough to grasp the shaft 16, as clearly shown in Figs. 2 and 3, a bolt 33 being provided for locking each arm to said shaft, and each arm carries a shelf 34 at the lower edge of one side thereof for a reason to be explained. Each of the said arms carries a pivot pin 35, serving as pivots for hooks 36 and 37 for the respective arms 31 and 32, each of which hooks is normally held in position as a longitudinal extension of the respective arm by means of a coil spring 38, Fig. 8, and I prefer to cut away the under corners of the hooks at their pivotal supports, as also shown in said Fig. 8, in order to prevent snow, ice, or other foreign matter, from clogging the swinging movement of the hooks with respect to the respective arms.

In the positions of the parts shown in Figs. 1 and 2, the vertical rod 10 may be easily detached from its engagement with the hooks 36 and 37 because of the outward positions of said hooks and the consequent slackness of the wires 11, thus allowing passage through the opening in the fence between the fixed posts 9 and 12.

When it is desired to close the gate, the rod 10 is engaged with the hooks 36 and 37, and held in such engagement while the lever arm 24 is grasped and revolved from its position against one side of the stop 26 through approximately a complete circle against the opposite side of said stop. This rotates the shaft 16, through the medium of the pinion and gear, through 180 degrees of a circle and swings the arms 31 and 32 toward the post 12 into the position shown in Fig. 3, thereby drawing the hooks 36 and 37 therewith, as well as the rod 10, and the wires 11 are tightened and passage through the fence opening prevented.

It will be noted that the pivots 35 are set to one side of the longitudinal axial planes of the arms 31 and 32 whereby the direction of strain on the pivots 35 is over the center of the shaft 16 when the arms and hooks are in retracted positions as shown in Fig. 3 and, in view of the fact that the lever arm 24 bears against the stop 26, the arms and hooks are automatically locked in retracted positions to resist any strain which might be placed upon the wires 11, and the shelves 34 serve as rests for the hooks when the parts are in retracted positions.

To open the gate, all that is necessary is to throw the lever 23 into initial position, thereby swinging the arms 31 and 32 into outermost positions and releasing the tensional strain of the hooks 36 and 37 from the rod 10 and wires 11, after which the rod 10 is detached from the said hooks and placed out of the way, as against the fixed portion of the fencing, not shown, this being easily possible because of the flexibility of the wires 11.

Inasmuch as the wires 11 may be made of any desired length, my gate is adaptable to any width of fence opening, is quickly and easily installed, is highly practical, very efficient, and comparatively inexpensive, and I may utilize the same to protect one entire side of an inclosure, or to divide an inclosure into sections, as for the segregation of live stock, without the need for setting out posts for the dividing fence formed by my device with the wires 11 of corresponding lengths.

It will be noted that I may adjust the arms 31 and 32 along the length of the angular shaft 16 in order to accommodate the gate fastener to gates of different heights.

By reference to Fig. 8 it will be seen that I provide a sleeve on the hook member 37, as well as on 36, which insures a broad bearing and consequent strength and rigidity.

As will be understood, I do not confine myself to the exact details of construction shown and described, nor to the particular material of the gate itself, as my device is applicable to gates made of woven field fencing, barbed wire, and the like, although my device is particularly adaptable to gates constructed of flexible material.

Having fully described my invention, what I claim as new, and desire to secure by Letters Patent, is:—

1. The combination with two fence posts, of a gate, comprising a plurality of wires secured to one of said posts, a rod carried by said wires, a vertical shaft rotatably mounted on the other post, a gear on said shaft, upper and lower hooks carried by said shaft, a pinion enmeshed with said gear, means for supporting said pinion, a lever provided with arms of unequal lengths for rotating said pinion to rotate said shaft to draw said rod, when engaged by said hooks, toward said shaft, and a pin fixed in the path of the longer of said lever arms to limit lever movement.

2. In combination with two spaced posts causing an interruption in a fence, a gate, comprising a plurality of wires secured to one of said posts, a vertical rod secured to the free ends of said wires, a vertical shaft rotatably carried by the other post, upper and lower arms adjustably secured to said shaft, a hook pivotally connected with each arm, a spring for holding each hook in desired relationship with the respective arm, a gear on said shaft, a pinion enmeshed with said gear, means for supporting said pinion, and means for actuating said pinion to rotate said shaft to draw said rod, when engaged with said hooks, toward said shaft to apply tension to said wires.

In testimony whereof I have signed my name to this specification in the presence of two subscribing witnesses.

JEFFERSON D. TEETERS.

Witnesses:
WILLIAM ISAAC LUTHER,
JAMES J. McCLELLAND.